(12) United States Patent
Bambauer et al.

(10) Patent No.: US 11,678,603 B2
(45) Date of Patent: Jun. 20, 2023

(54) TRAILERED ENGINE DRIVEN LAGOON PUMP FOR MIXING AND PUMPING MANURE SLURRIES

(71) Applicant: Bambauer Equipment, New Knoxville, OH (US)

(72) Inventors: Scott A. Bambauer, New Knoxville, OH (US); Jack Steinke, Knoxville, OH (US)

(73) Assignee: BAMBAUER EQUIPMENT, New Knoxville, OH (US)

( * ) Notice: Subject to any disclaimer, the term of this patent is extended or adjusted under 35 U.S.C. 154(b) by 506 days.

(21) Appl. No.: 16/861,508

(22) Filed: Apr. 29, 2020

(65) Prior Publication Data

US 2020/0344945 A1   Nov. 5, 2020

Related U.S. Application Data

(60) Provisional application No. 62/842,014, filed on May 2, 2019.

(51) Int. Cl.

| | |
|---|---|
| *A01C 23/00* | (2006.01) |
| *B60S 9/14* | (2006.01) |
| *B62D 7/20* | (2006.01) |
| *B62D 21/17* | (2006.01) |
| *B62D 21/20* | (2006.01) |
| *B62D 63/08* | (2006.01) |

(52) U.S. Cl.
CPC .......... *A01C 23/008* (2013.01); *A01C 23/002* (2013.01); *B60S 9/14* (2013.01); *B62D 7/20* (2013.01); *B62D 21/17* (2013.01); *B62D 21/20* (2013.01); *B62D 63/08* (2013.01)

(58) Field of Classification Search
CPC . B62D 7/08; B62D 7/20; B62D 21/17; B62D 21/20; B62D 63/08; A01C 23/008; A01C 23/002; A01C 3/026; A01C 23/045; B60S 9/14
See application file for complete search history.

(56) References Cited

U.S. PATENT DOCUMENTS

| | | | | |
|---|---|---|---|---|
| 1,835,436 | A | * 12/1931 | Wharton | ................... B60P 3/40 |
| | | | | 280/80.1 |
| 2,305,880 | A | * 12/1942 | Leighton | ............. F16C 11/0647 |
| | | | | 280/93.508 |

(Continued)

*Primary Examiner* — Paul N Dickson
*Assistant Examiner* — Timothy Wilhelm
(74) *Attorney, Agent, or Firm* — Dinsmore & Shohl LLP

(57) ABSTRACT

A lagoon pump may comprise a chassis structure having front and rear ends; a tow bar couple releasably to the front end of the chassis structure; a centrifugal pump couple to the rear end of the structure; a diesel engine fluidly connected to a fuel tank; a clutch rotationally connected to the diesel engine; an extended driveline directly connected to the clutch at one end and to the pump at an opposed end to drive the pump via rotational energy from the diesel engine; a pair of steerable wheels connected adjacent the front end of the chassis structure; and ground engaging wheels connected under the chassis structure between the ends, wherein the ground engaging wheels are both extendable radially outwardly and rotatable axially relative to the chassis structure. A method of mixing and pumping a slurry material from a lagoon or storage pit utilizing such a pump is also disclosed.

20 Claims, 15 Drawing Sheets

(56) References Cited

U.S. PATENT DOCUMENTS

| | | | | |
|---|---|---|---|---|
| 2,508,087 A * | 5/1950 | Bailey | A01K 80/00 | 37/906 |
| 2,566,565 A * | 9/1951 | Hill | B62D 7/20 | 280/103 |
| 2,896,543 A * | 7/1959 | Ogles | F04D 29/628 | 415/143 |
| 2,944,829 A * | 7/1960 | Herbenar | B62D 7/16 | 280/93.508 |
| 3,104,821 A * | 9/1963 | Anderson | A01G 25/097 | 239/744 |
| 3,151,696 A * | 10/1964 | Deford | B62D 5/06 | 180/435 |
| 3,180,423 A * | 4/1965 | Gibbs | A62C 27/00 | 280/4 |
| 3,229,992 A * | 1/1966 | Traywick | B62D 7/00 | 280/90 |
| 3,344,721 A * | 10/1967 | Ferm | E01C 19/238 | 404/75 |
| 3,352,374 A * | 11/1967 | Vivian | B62D 3/14 | 180/438 |
| 3,371,614 A * | 3/1968 | Crisafulli | F04D 13/02 | 415/213.1 |
| RE26,675 E * | 9/1969 | Ferm et al. | E01C 19/238 | 404/129 |
| 3,525,533 A * | 8/1970 | Mazur | B62D 7/16 | 280/93.511 |
| 3,556,406 A * | 1/1971 | King | A01G 25/097 | 239/731 |
| 3,587,767 A * | 6/1971 | Gamaunt | B62D 5/093 | 280/93.502 |
| 3,611,680 A * | 10/1971 | Hendrickson | A01D 44/00 | 56/364 |
| 3,620,549 A * | 11/1971 | Miller | B62D 13/06 | 280/445 |
| 3,659,712 A * | 5/1972 | Chaplin | E02F 3/92 | 210/744 |
| 3,740,075 A * | 6/1973 | Soehnlen | B62D 53/04 | 280/30 |
| 3,799,217 A * | 3/1974 | Bauer | B67D 7/00 | 405/36 |
| 3,832,093 A * | 8/1974 | Shirek | F04D 29/605 | 417/231 |
| 3,938,822 A * | 2/1976 | Guerriero | B62D 7/20 | 403/44 |
| 3,948,450 A * | 4/1976 | Erlitz | B01F 33/502 | 241/97 |
| 3,958,895 A * | 5/1976 | Brisson | F04D 7/045 | 417/234 |
| 4,070,135 A * | 1/1978 | Eller | F04D 13/04 | 37/317 |
| 4,175,916 A * | 11/1979 | Crisafulli | B62D 63/064 | 280/789 |
| 4,306,967 A * | 12/1981 | Trautwein | B03B 9/061 | 210/260 |
| 4,594,006 A | 6/1986 | Depeault | | |
| 4,616,979 A * | 10/1986 | Hynes | F04D 13/04 | 417/361 |
| 4,625,982 A * | 12/1986 | Matsuo | B62K 5/08 | 280/267 |
| 4,655,467 A * | 4/1987 | Kitzmiller | B60G 11/225 | 280/124.128 |
| 4,659,293 A * | 4/1987 | Evenson | F04B 15/023 | 417/900 |
| 4,661,046 A | 4/1987 | Ruyle | | |
| 4,720,119 A * | 1/1988 | Ritter | B62D 13/04 | 280/419 |
| 4,770,601 A * | 9/1988 | Crisafulli | F04D 29/044 | 415/109 |
| 4,957,622 A * | 9/1990 | Mims | E02F 3/885 | 37/313 |
| 4,971,526 A | 11/1990 | Ruyle | | |
| 4,986,386 A * | 1/1991 | Iwamoto | B60B 35/003 | 180/209 |
| 5,025,616 A * | 6/1991 | Moss | A01D 67/005 | 172/313 |
| 5,090,719 A * | 2/1992 | Hanaoka | B62D 7/142 | 280/445 |
| 5,100,303 A * | 3/1992 | Depault | A01C 3/026 | 417/361 |
| 5,340,142 A * | 8/1994 | Kuhns | B62D 13/04 | 280/89 |
| 5,364,233 A * | 11/1994 | Benoit | F04D 29/406 | 417/234 |
| 5,522,281 A * | 6/1996 | Herman | F16C 7/06 | 384/276 |
| 5,544,475 A * | 8/1996 | Skibo | A01D 67/005 | 56/DIG. 14 |
| 5,570,754 A * | 11/1996 | Stimson | B60K 17/358 | 180/234 |
| 5,624,241 A * | 4/1997 | Nesseth | E04G 21/0436 | 417/430 |
| 5,704,623 A * | 1/1998 | Chapman | B66F 11/048 | 280/47.11 |
| 5,722,504 A * | 3/1998 | Gaetani | B66F 9/07559 | 280/98 |
| 5,765,844 A * | 6/1998 | Wood | B62D 17/00 | 280/771 |
| 5,769,502 A * | 6/1998 | Bettini | B60P 1/045 | 298/220 |
| 6,283,483 B1 * | 9/2001 | Johnson | B62D 9/00 | 280/5.522 |
| 6,386,564 B1 * | 5/2002 | Kincad | B62D 17/00 | 280/93.511 |
| 6,443,079 B1 * | 9/2002 | Horsch | A01B 69/006 | 111/24 |
| 6,517,097 B1 * | 2/2003 | Stark | B62D 13/02 | 280/455.1 |
| 6,520,750 B2 * | 2/2003 | Eller | E03B 3/04 | 417/361 |
| 6,557,658 B1 * | 5/2003 | Enmeiji | B62D 7/1509 | 180/234 |
| 6,561,715 B2 * | 5/2003 | Wasylewski | B62D 7/16 | 403/70 |
| 7,093,681 B2 * | 8/2006 | Strain | F16D 1/112 | 180/247 |
| 7,134,829 B2 * | 11/2006 | Quenzi | B60P 3/122 | 180/41 |
| 7,416,198 B2 * | 8/2008 | Blaszynski | B62D 7/228 | 280/93.511 |
| 7,547,028 B1 * | 6/2009 | Blaszynski | B62D 7/20 | 403/14 |
| 7,690,470 B2 * | 4/2010 | Iwaki | B62D 9/002 | 180/254 |
| 7,874,571 B2 * | 1/2011 | Frey | B60G 3/14 | 280/445 |
| 7,914,023 B2 * | 3/2011 | Zaloga | B62D 7/08 | 403/228 |
| 8,186,696 B2 * | 5/2012 | Komoto | C21D 1/25 | 148/654 |
| 8,770,602 B1 * | 7/2014 | Belleau | B62D 7/20 | 280/93.51 |
| 8,939,637 B2 * | 1/2015 | Depault | A01C 3/026 | 417/900 |
| 8,950,521 B2 * | 2/2015 | Piontek | B62D 7/08 | 180/6.34 |
| 8,998,228 B2 * | 4/2015 | Messenger | B62D 7/228 | 280/93.511 |
| 9,227,661 B2 * | 1/2016 | Seibert | B62D 7/20 | |
| 9,278,710 B2 * | 3/2016 | Bokil | B62D 7/20 | |
| 9,395,049 B2 * | 7/2016 | Vicknair | E21B 41/00 | |
| 9,828,051 B2 * | 11/2017 | Gray | B62D 13/04 | |
| 9,877,470 B2 * | 1/2018 | Crinklaw | G05D 1/0278 | |
| 9,945,365 B2 * | 4/2018 | Hernandez | F04B 17/03 | |
| 10,633,020 B2 * | 4/2020 | Yasu | B21K 1/12 | |
| 10,836,424 B2 * | 11/2020 | Buchwitz | B62D 7/1581 | |
| 10,875,373 B2 * | 12/2020 | Reddehase | B60G 7/003 | |
| 11,015,594 B2 * | 5/2021 | Yeung | F16F 15/1202 | |

(56) References Cited

U.S. PATENT DOCUMENTS

| | | | |
|---|---|---|---|
| 11,124,232 B2 * | 9/2021 | Chen | A01B 69/007 |
| 11,214,328 B2 * | 1/2022 | Staal | B62K 21/00 |
| 2015/0367297 A1 | 12/2015 | Tews | |
| 2016/0159393 A1 * | 6/2016 | Messenger | B62D 7/20 |
| | | | 403/109.1 |
| 2016/0229480 A1 * | 8/2016 | Mori | B60G 3/20 |
| 2019/0061814 A1 * | 2/2019 | Saiki | B21J 5/02 |

* cited by examiner

Example of backing this lagoon pump into a lagoon

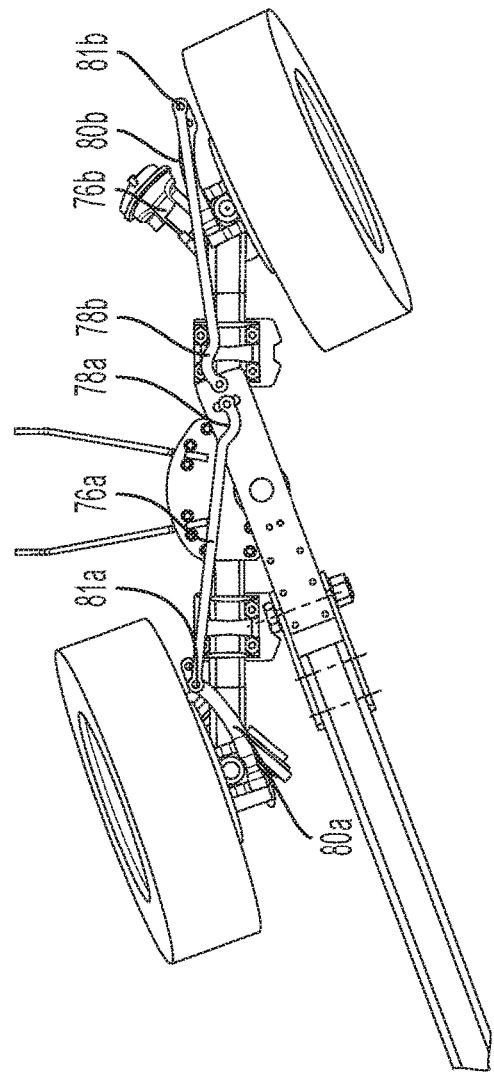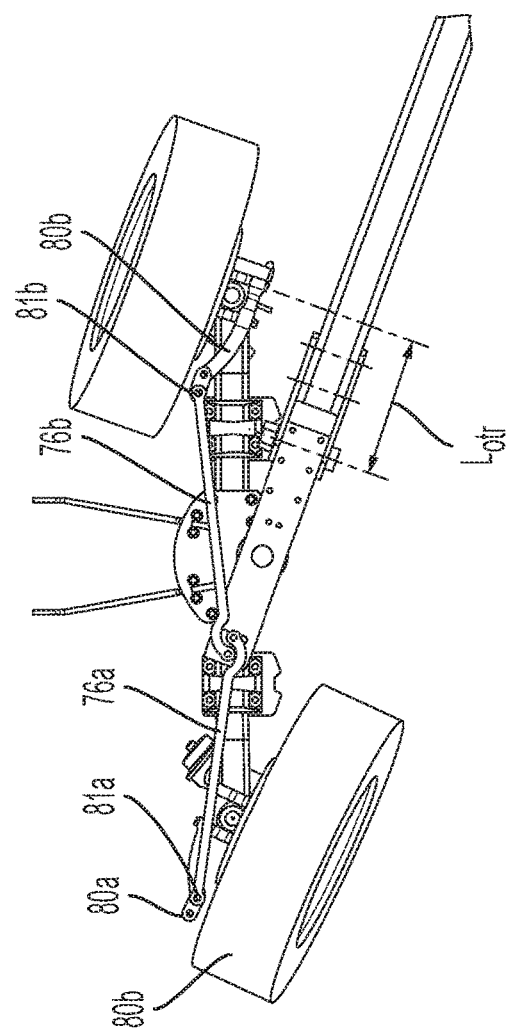
FIG. 13A
FIG. 13B

TRAILERED ENGINE DRIVEN LAGOON PUMP FOR MIXING AND PUMPING MANURE SLURRIES

CROSS-REFERENCE TO RELATED APPLICATIONS

This application claims the benefit of U.S. Provision Application Ser. No. 62/842,014 filed May 2, 2019.

TECHNICAL FIELD

The present disclosure relates generally to lagoon pumps, or the like, and specifically to a trailered engine driven lagoon pump to be used in and about a farm for mixing and pumping a slurry material, like liquid manure, from a lagoon or storage pit by pumping through high pressure supply line hoses to a drag hose such as to spread at a field destination or into a suitable transport tank or spreading vehicle. The drag hose can be a soft hose or hard hose and is dragged throughout the field while applying the liquid through a surface applicator bar that sprays on top of the ground or through an injection toolbar that injects the liquid directly beneath the soil.

BACKGROUND

Generally, today farmers wash, scrape and/or pump animal manure into man-made lagoons or storage pits generally located under or adjacent to a barn. The lagoons or storage pits typically are made large enough to store this slurry material for several days, weeks, or even months, if necessary. In most cases, liquid manure pumps are submerged in the slurry of manure only at the time of pumping.

The pumping units developed to handle this liquid manure are rather cumbersome and heavy devices which required some type of a wheeled support or trailer to permit convenient placement of the pump units into such large man-made lagoons or storage pits. Various types of pumping units and trailers have been designed, but the two most common methods employed to pump out a lagoon through a drag hose pumping system are: suction draw and force feeding.

For suction draw, a diesel engine driven centrifugal pump that is provided on a trailer utilizes a suction hose to vacuum draw the liquid slurry out of the lagoon or storage pit and into the pump's inlet and then out, in many cases, to a field destination via a discharge hose connected to the pump's outlet. The pump used in this method is characterized as high pressure in which the discharge pressure at the pump's outlet is needed to push the drawn liquid slurry within the discharge hose often over long distances to a desired field destination. One noted downside of using the above engine/pump setup to implement the suction draw method is that as the liquid slurry level lowers in the lagoon, the absolute Net Positive Suction Head (NPSHA) lowers, which results in lower performance of the pump (lower pump efficiency and flow rates according to pump curves) and hence a less efficient process. Additionally, as a result of a lowering absolute NPSH, the possibility of cavitation occurring in the pump increases, i.e., the available NPSH becomes dynamically and/or unexpectedly less than the NPSH required to prevent cavitation (NPSHR), which can cause premature wear.

For force feeding, this method has the same engine/pump setup as the suction draw method; however, an additional hydraulic pump is driven off the diesel engine to provide hydraulic power to a low pressure, high volume pump that is submerged in the lagoon, often via a crane or boom. This additional pump forces the slurry liquid into the inlet side of the high pressure, lower volume (centrifugal) pump to help pumping performance as the liquid slurry level lowers in the lagoon. Or, a traditional lagoon stick pump (a separate, secondary unit that is pulled around) can be hydraulically driven from the same hydraulic system mentioned above or a Power Take Off (PTO) pump, driven by a driveline of an agricultural tractor. There are several downsides, however, with the setup of these force feed methods. A large, additional, complex hydraulic system(s) is required to not only drive the secondary force feeding pump/lagoon stick pump, but also the crane/boom system to maneuver the force feeding pump in/out of the lagoon. Also, while it takes the same energy/horsepower for the high-pressure centrifugal pumps to pump the liquid to the field destination, it takes additional horsepower (approximately 50-200HP) to drive the force feed pump depending on system size and performance desired. If using a driveline for the lagoon stick pump, an additional tractor is then required to provide the necessary horsepower. In other words, to maintain flow performance all the way down to the bottom of the lagoon, farmers and/or commercial applicators are faced with having to add costly, higher maintenance force feed systems which can ultimately result in higher charges to their customers.

There is thus a need for a new apparatus for mixing and pumping manure slurries.

SUMMARY

In view of the above, described herein are various embodiments for a trailered engine driven lagoon pump to be used in and about a farm for mixing and pumping a slurry material, like liquid manure and other pumpable liquids, from a lagoon or storage pit such as to spread at a field destination or into a suitable transport tank or spreading vehicle. The lagoon pump may comprise: an elongated chassis structure having a front end and a rear end; a tow bar couple releasably to the front end of the elongated chassis structure such that lagoon pump is towable behind an agricultural tractor; a centrifugal pump couple to the rear end of the elongated chassis structure; a diesel engine fluidly connected to a fuel tank; a clutch rotationally connected to the diesel engine; an extended driveline directly connected to the clutch at one end and to the pump at an opposed end to drive the pump via rotational energy from the diesel engine; a pair of steerable wheels connected adjacent the front end of the elongated chassis structure; and a set of left and right hand ground engaging wheels are connected under the chassis structure between the front and rear ends, wherein the ground engaging wheels are both extendable radially outwardly and rotatable axially relative to chassis structure.

These and additional features provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the following drawings, where like structure is indicated with like reference numerals and in which:

FIGS. 9-14 are depictions of a trailered engine driven lagoon pump and specific components thereof according to a second embodiment.

Figure 1:
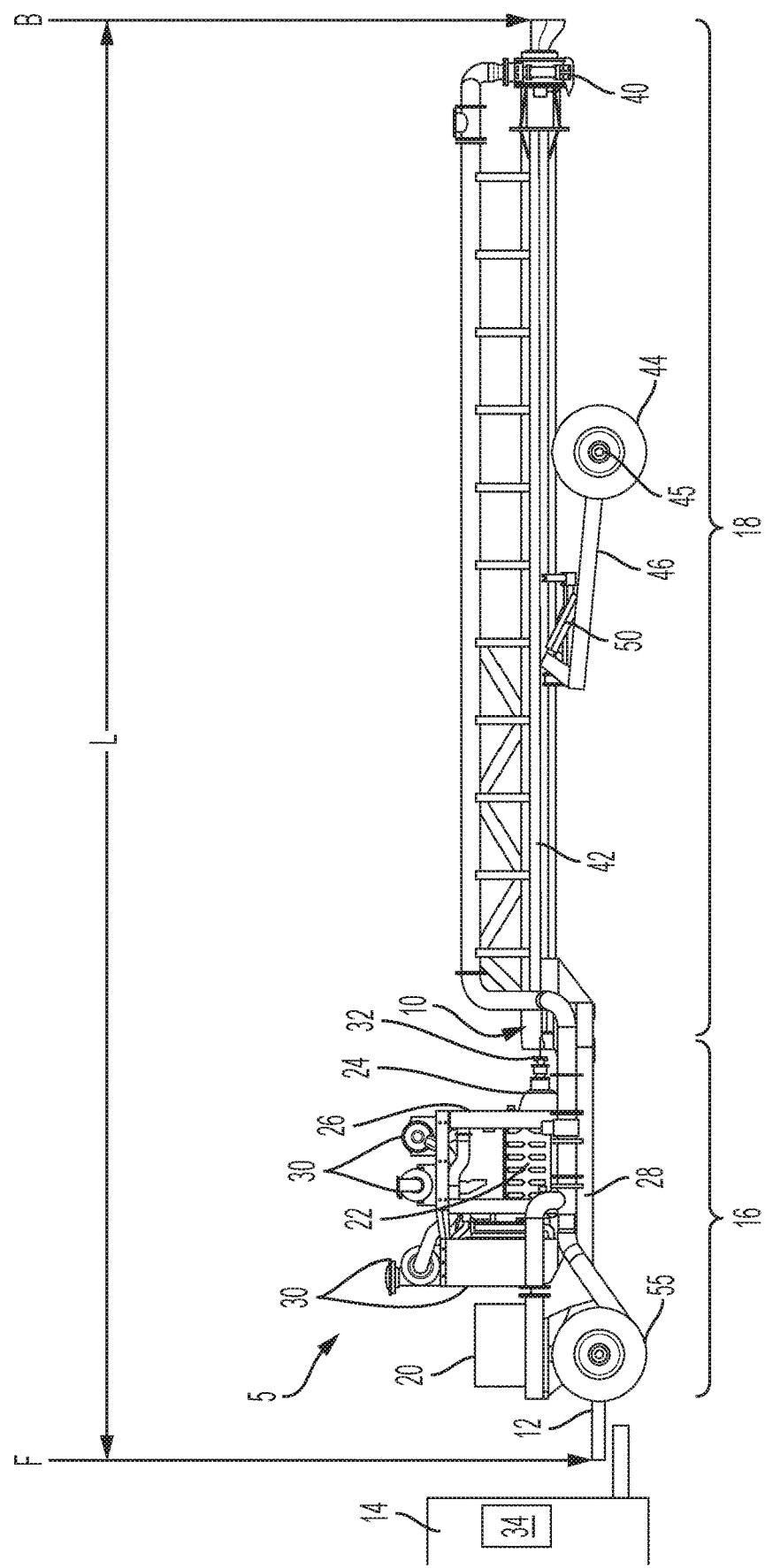
FIGS. 1-3 are a side plan view of a trailered engine driven lagoon pump according to a first embodiment that is to be used in and about a farm or other locations for mixing and pumping a slurry material, like liquid manure, from a lagoon or storage pit such as to spread at a field destination or into a suitable transport tank or spreading vehicle as described herein.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

Referring to the drawings, like numbers indicate like parts throughout the views. Skilled artisans appreciate that elements in the figures are illustrated for simplicity and clarity and have not necessarily been drawn to scale. For example, the dimensions of some of the elements in the figures may be exaggerated relative to other elements, as well as parts removed to help to improve understanding of the various embodiments of the present invention.

It is to be appreciated that the trailered engine driven lagoon pump according to the various embodiments disclosed hereinafter and shown in the illustrated embodiments of FIGS. 1-14, is a complete unit that encompasses the engine, driveline, single pump, steering, wall-walker and agitation options needed to provide industry sufficient flow and pressure to pump liquid slurry from all depths of a lagoon while requiring less energy than the other engine/pump setups mentioned above in the background section. Due to the integrated and novel design, some of the other noted advantages, and not limited thereto, of the herein disclosed lagoon pump are: more cost-effective to manufacture, lower in cost for end users to purchase, and lower operational and maintenance costs, all the while still meeting, if not exceeding, industry requirements and needs. In addition, it is to be appreciated that the pump according to the various embodiments disclosed hereinafter could be used in a variety of operations in addition to liquid animal waste pumping from lagoon such as, e.g., pumping of municipal liquid waste, liquid lime, water transfer and water irrigation.

Figure 2:
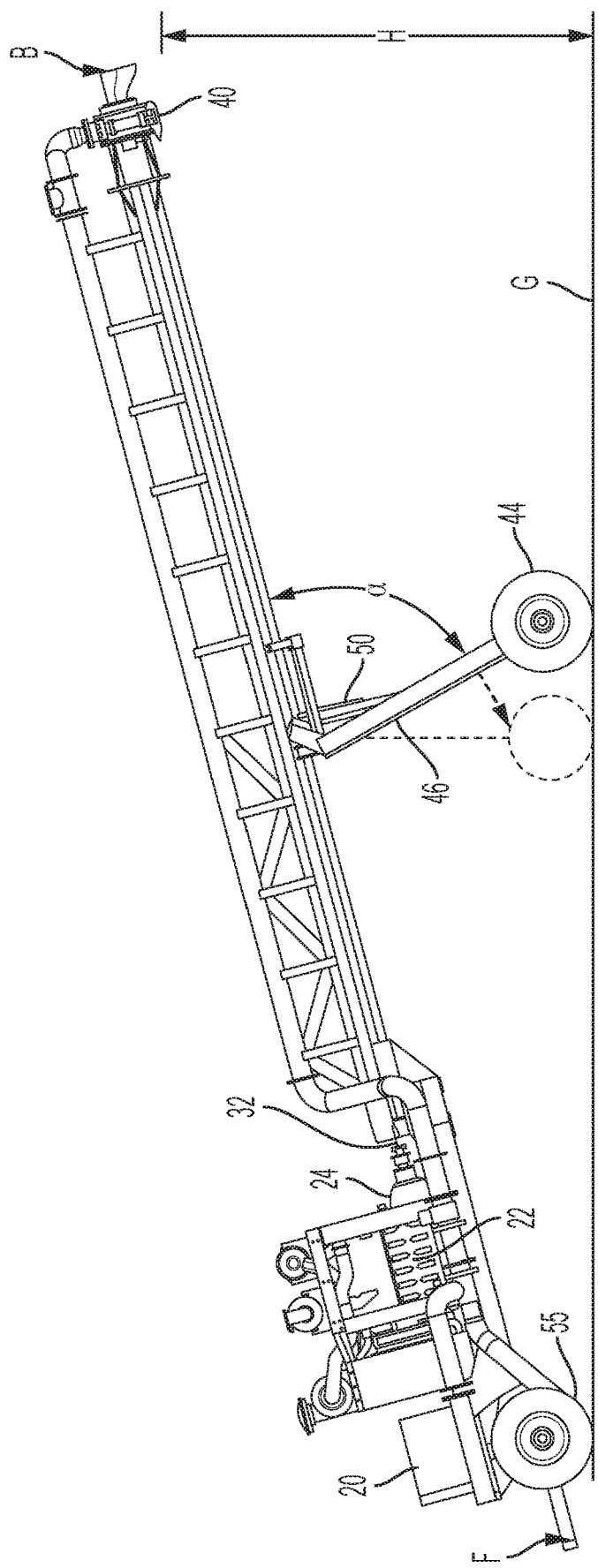
Figure 3:
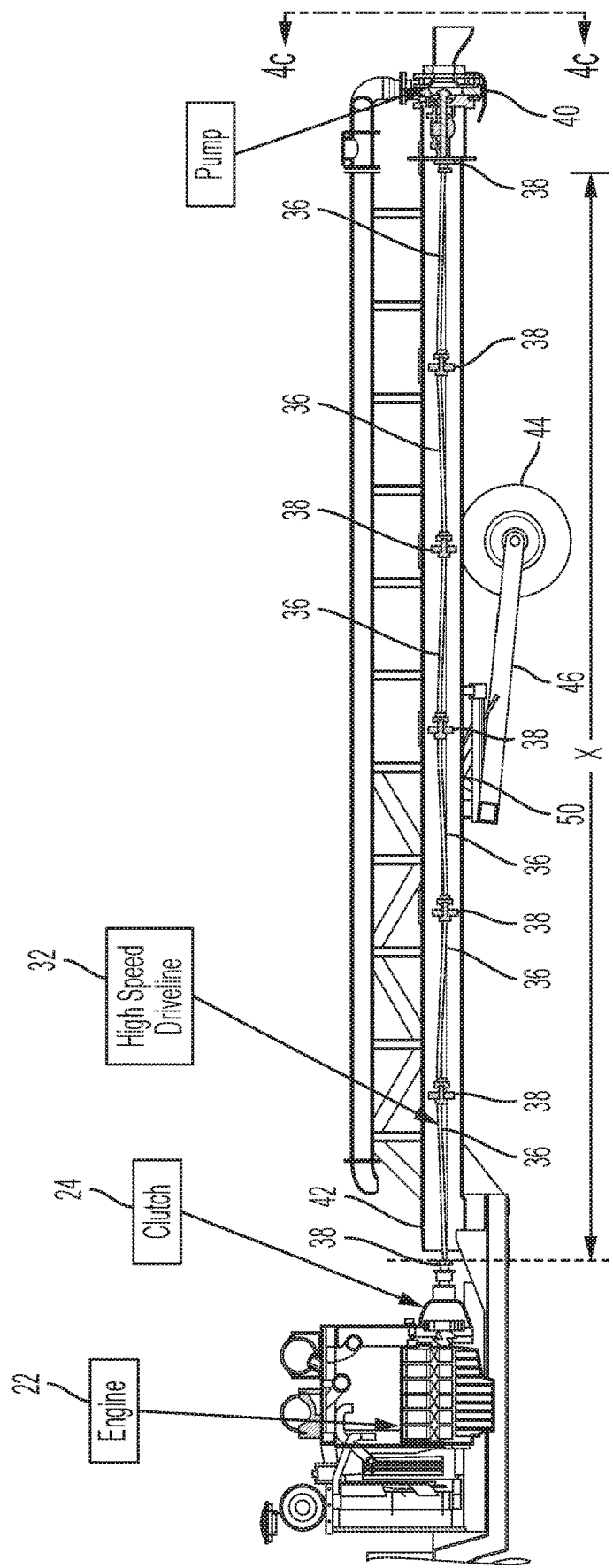

Referring now generally to the drawings and specifically to FIGS. 1-3, the trailered engine driven lagoon pump 5 according to a first embodiment and suitable for mixing solids and liquids contained in a lagoon or manure pit P (FIGS. 8A-8K) into a slurry and for then pumping the manure slurry into a tank of a spreader (not shown) or to a field destination is depicted. The lagoon pump 5 is provided with an elongated chassis structure 10 which has an overall length L, measured from front end F to and back end B, which length L ranges from approximately 38 to 75 feet, and is suitable for use in a lagoon P have a depth up between approximately 6 to 30 feet, respectively. The chassis structure 10 at the front end F is adapted via a hitch plate or tow bar 12 to be towed behind an agricultural tractor 14, or any other capable powered vehicle. The hitch plate/tow bar 12 may be a triangularly shaped hitch plate or straight tow bar provided with conventional connecting means (not shown) for releasable connecting the chassis structure 10 to the tractor 14 at and/or adjacent the front end F.

The chassis structure 10 is defined by a first wheeled support section 16 and a second wheeled support section 18. Rearward of the hitch plate or tow bar 12 and provided on the first wheeled support section 16 of the chassis structure 10 are a fuel tank 20, a diesel engine 22 fluidly connected to the fuel tank, and a clutch 24 connected to the engine. A plurality of resilient mounts (not shown) may be provided to releasably connect the engine 22 to the chassis structure 10 while also providing vibrational damping and ease of removal such as for periodic maintenance and/or replacement.

The fuel tank 20 has a fuel capacity which can range from 250 to 1000 gallons which provides the diesel engine 22 enough fuel to operate in the range of 12 to 24 hours, dependent on engine and pump sizing.

The diesel engine 22 is conventional, and is rated for 250 to 1000 horsepower. Suitable diesel engines for this operation are commercially available from John Deere, Caterpillar, Cummins, Volvo, Detroit, Iveco or any other name brand engine intended for such an application.

Forward of the clutch 24 and still in the first wheeled support section 16, a transverse support bracket 26 extends from a support surface 28 of the chassis structure 10 over the engine 22. Further engine components 30 that are necessary to operate the engine 22, such as a radiator, intake manifolds, air cleaners, turbo units, exhaust system components, ignition system components, control units, visual/audible indicators, operator controls and the like, may be mounted to bracket 26 and/or forward thereof in front of the engine 22 for convenience of location and accessibility. As such engine components 30 are conventional no further discussion is provided.

As depicted in the figures, the clutch 24 extends rearward from the engine 22 to connect to the second wheeled support structure 18 of the chassis structure 10. Specifically, the clutch 24 is hooked directly to a high speed extended driveline 32. It is to be appreciated that no gearbox is used, which simplifies the maintenance and lowers the overall manufacture cost of the pump 5. Suitable clutches for this type of operation are commercially available from Logan Clutch, WPT Power, and Twin Disc or any other name brand clutch intended for such an application. In other embodiments, it is to be appreciated that the clutch may be also omitted. In such a clutch-less embodiment, the high-speed driveline 32 would be connected directly to the engine's fly wheel drive plate (not shown) and as soon as the engine 22 is started, the driveline 32 will drive a pump 40.

When engaged by the clutch 24, the driveline 32 is driven by the diesel engine 22 to rotate faster than the typical 1000 RPM of a conventional PTO unit 34 of the agricultural tractor 14 (FIG. 1). In various embodiments, the driveline 32 is rated to operate and rotate above 1000 RPM and up to 2300 RPM, more preferably between 1300-2200 RPM. The driveline 32 is made of at least one (1) and up to ten (10) driveline shafts 36 that are connected in series, via associated universal joints 38, for a total length of ranging from about 30 to about 50 feet, and in one preferred embodiment about 40 feet. In the illustrated embodiment of FIG. 3, six (6) driveline shafts 36 are shown.

Figure 4A:
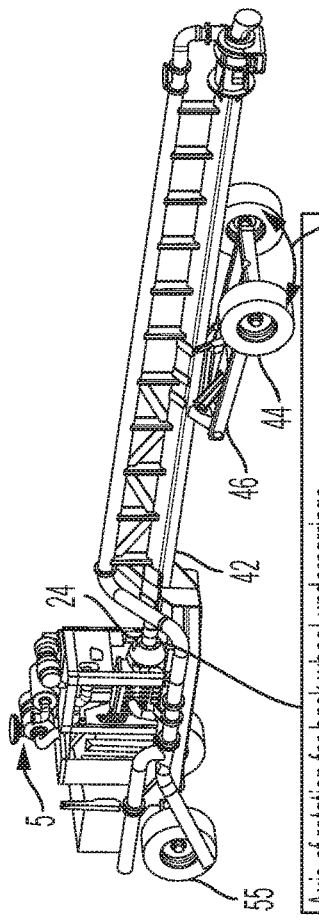
FIG. 4A is a side elevational view of the trailered engine driven lagoon pump of FIGS. 1-3.
Figure 4C:
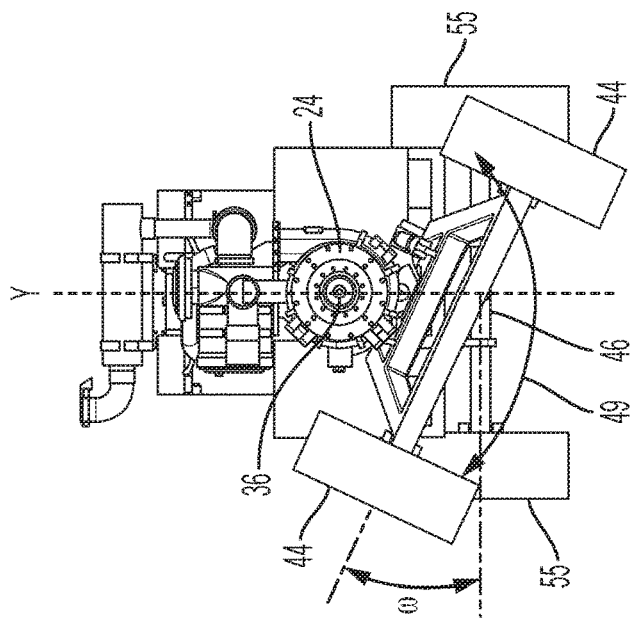
FIG. 4C is a back view of the trailered engine driven lagoon pump of FIG. 3.

The longitudinal length of the driveline 36 defines a longitudinal axis X (FIG. 3), which is centered to and essentially divides the chassis structure 10 in half as best depicted by FIG. 4C. It is to be appreciated that FIG. 4C depicts a back view, i.e. from a point standing behind the inlet of the pump 40 and viewed down the longitudinal length L towards the front end F (FIG. 1).

Adjacent the back end B, the driveline 32 is connected to and drives the pump 40, which may be a centrifugal, high pressure pumping unit. At the above mentioned rotation speed, the driveline 32 rotates the pump 40 sufficiently to provide a pumping capacity that ranges from 1000 to 10000 GPM. The main advantage of operating pump 40 at such a high rotation speed is that more kinetic energy is imparted to the drawn liquid slurry and thus a larger head pressure results, increasing pumping delivery distances to field destinations. Suitable pumps rated for this operating speed and conditions are available from Cornell, e.g., model 81022 and other companies that provide various styles of centrifugal pumps.

Figure 4B:
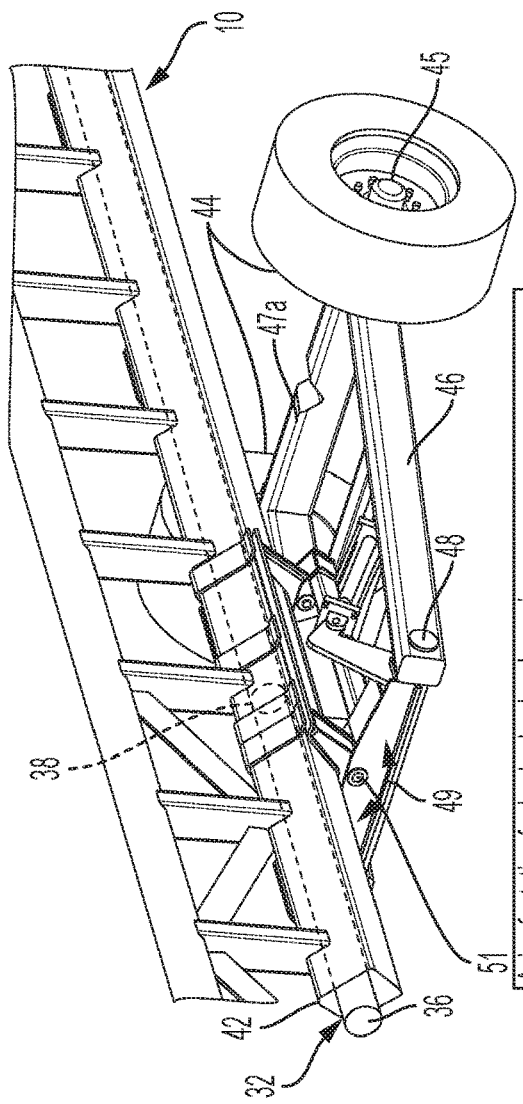
FIG. 4B is a close-up, side elevational view of a section of the trailered engine driven lagoon pump of FIG. 4A according to an embodiment.
Figure 4E:
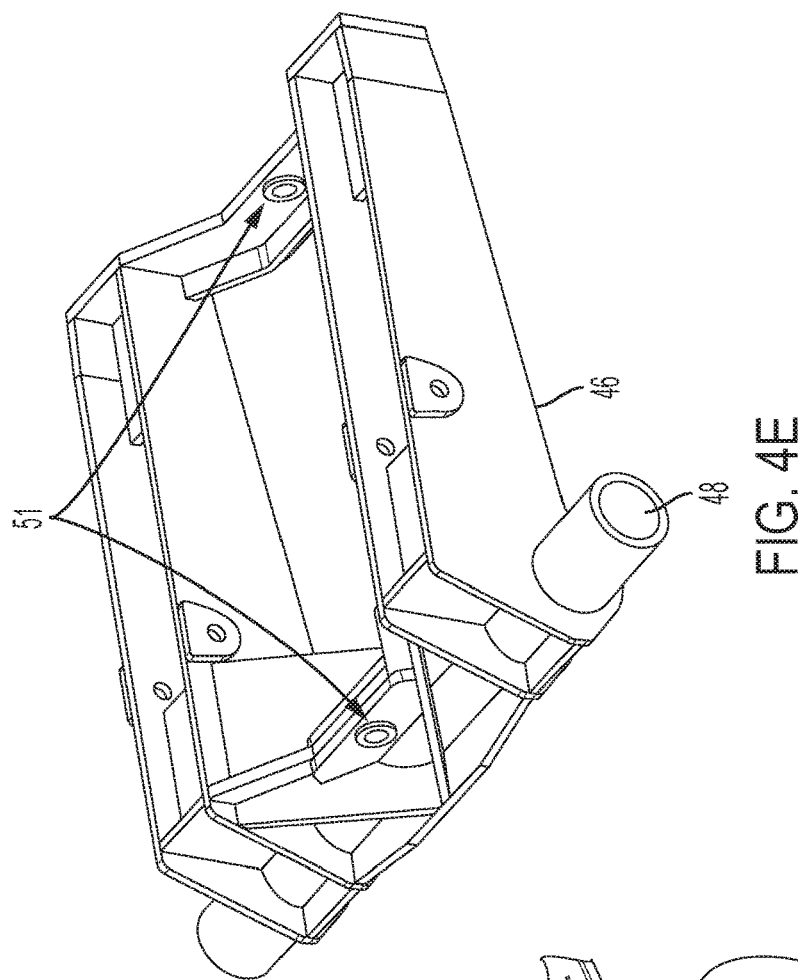
FIG. 4E is a close-up, side elevational view of a sub-frame section of the trailered engine driven lagoon pump of FIG. 4A with parts removed for convenience of illustration.
Figure 4D:
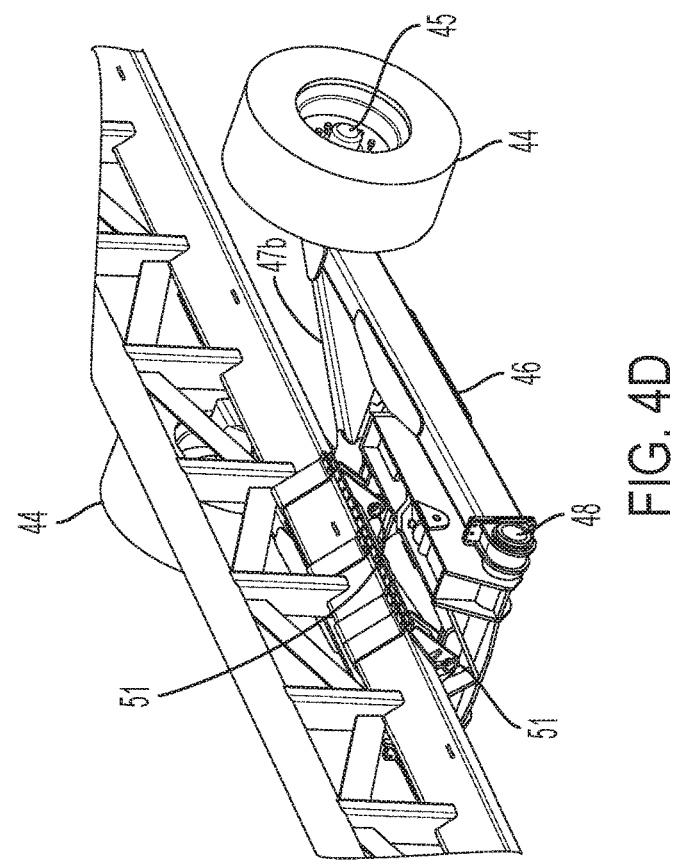
FIG. 4D is a close-up, side elevational view of a section of the trailered engine driven lagoon pump of FIG. 4A according to another embodiment.

As best depicted by FIG. 4B, aft of the clutch 24, the driveline 32 extends internally within a protective boxed frame 42 of the chassis structure 10. Although the boxed frame 42 is shown structurally formed with four (4) sides, it may be also provided formed as any suitable regular or irregular polygon shape as well as with a circular, oval, or elliptical shape that may accommodate the driveline 32 therein. The pump unit 40 may be bolted or otherwise suitably mounted to the boxed frame 42 at and/or adjacent the back end B.

Underneath the boxed frame 42, a set of left and right hand ground engaging wheels 44 are connected thereto via a sub-frame 46. In one embodiment and depicted by FIG. 4B, the sub-frame 46 at a first end extends the wheels 44 radially outwardly, right and left, from the boxed frame 42 via an included straight axle 47a. In another embodiment and depicted by FIG. 4D, the sub-frame 46 at a first end extends the wheels 44 radially outwardly, right and left, from the boxed frame 42 via an included bent axle or v-support 47b. In these embodiments, the wheels 44 are each mounted for rotation on a respective stub shaft 45 that extend horizontally outwardly from the axle 47a and 47b.

At a second end remote from the first end, the sub frame 46 is connected rotatably to the boxed frame 42 via a rotary joint 48 (which is the same in both the axel type embodiments). The rotary joint 48 permits the sub-frame 46 to pivot only along the longitudinal axis X (FIG. 3), and to assume a pivoted positioned relative to the boxed frame 42 as best depicted by FIG. 2. A pair of hydraulic cylinders 50 (one for each wheeled side of the sub-frame) or other suitable actuators may be provided between the boxed frame 42 and the sub-frame 46 in order to pivot the sub-frame 46 relative to the frame boxed frame 42, and which defines a pivot angle α. The hydraulic cylinders 50 may be powered and controlled via the standard hydraulics system, e.g., PTO unit 34, of the agricultural tractor 14 (FIG. 1) or via an independent hydraulic system placed on the first wheeled support section 16. In various embodiments, the pivot angle α may range from 0 to 90 degrees such that the pump unit 40 at the back end B may reach a height H above ground G ranging approximately from 0 to 18 feet. Raising the pump unit 40 above ground is helpful when positioning the pump unit 40 into the lagoon P via backing the lagoon pump 5 over an embankment E as depicted by the sequence of images of FIGS. 8A-8K, and vice-versa. It is to be appreciated that an optional vacuum prime system kit (not shown) could be added also to pump unit 40, if needed. If the situation presented itself that the pump unit 40 could not be submerged in the liquid (i.e., a vertical concrete wall hog pit with approximately 4'×5' access hole) via backing, the vacuum prime system would allow the pump unit 40 to suction draw out of these pits/situations.

In another embodiment, a pair of pivot couplers 51 (best depicted by FIG. 4E) is provided that further permits the sub-frame 46 to rotate axially relative to the boxed frame 42 about the same axis X, which is perpendicular to the depicted Y axis shown in FIG. 4C. This type of rotation is indicated by arrow 49 in FIGS. 4A-4C. Due to this pivot arrangement between the sub-frame 46 and boxed frame 42, wheels 44 may essentially rotate axially about the driveline 32, i.e. have a side-to-side roll angle ω (FIG. 4C) that may range from 0 to 25 degrees on each side relative to gravity, i.e. for a total of 50 degrees of side to side roll. It is to be appreciated that due to this arrangement, wheels 44 will rotate relative to a pair of wheels 55 located in the first wheel support section 16 as well as relative to the boxed frame 42 of the second wheeled support section 18. Such rotation helps to maintain the engine 22 adjacent the front end F and the pump 40 at the back end B of the chassis structure 10 both essentially in the same ground level orientation that is provided by wheels 55. In other words, the engine 22 and pump 40 do not tilt to either side of the longitudinal axis X when view from the back end B towards the front end F with the sub-frame 46 and wheels 44 but rather with wheels 55. Some of the noted advantages of providing such a pivoting wheeled sub-frame 46 to the lagoon pump 5, and not limited thereto, are that the lagoon pump can be backed down a lagoon on uneven ground and the rear wheels can follow various ground contours and angles, but still allow the front wheels with the engine mounted on the frame to stay more level. This keeps the unit more stable and easier to operate and steer. Also, if the agitator option is added, the force of the liquid out of the agitation nozzle 68 (FIG. 5) would have to tip the entire engine and trailer frame versus only the drive tube. Brakes 99 (FIG. 11), which form part of a provided conventional Air-Over-Hydraulic Braking System, are operated in the conventional manner and may be provided to either or both sets of wheels 44 and 55. In addition, wheels 44 and 55 may be 425/65R22.5 tires and 315/80R22.5 tires, respectively, in one embodiment and other suitable sizes in other embodiments, such as for example, floatation tires (e.g., 700/50R22.5) for the rear wheels 44 and oversized tires (e.g., 445/65R22.5) for the front wheels 55.

It is to be appreciated that in the embodiment depicted by FIGS. 4A and 4B, the sub-frame 46 is pivotably and rotatably coupled to the boxed frame 42 between the headend of the driveline 32 which couples to the clutch 24 and the pump unit 40 at the back end B. This defines a first rotation point of the lagoon pump 5 that is located within the boundaries of the second wheeled support section 18. In other embodiments, a second rotation point also providing the above described rotation may be provided within the boundaries of the first wheeled support section 16, such after the engine 22. In other embodiments, either or both the first and second rotation points may be provided to the lagoon pump 5.

Figure 5:
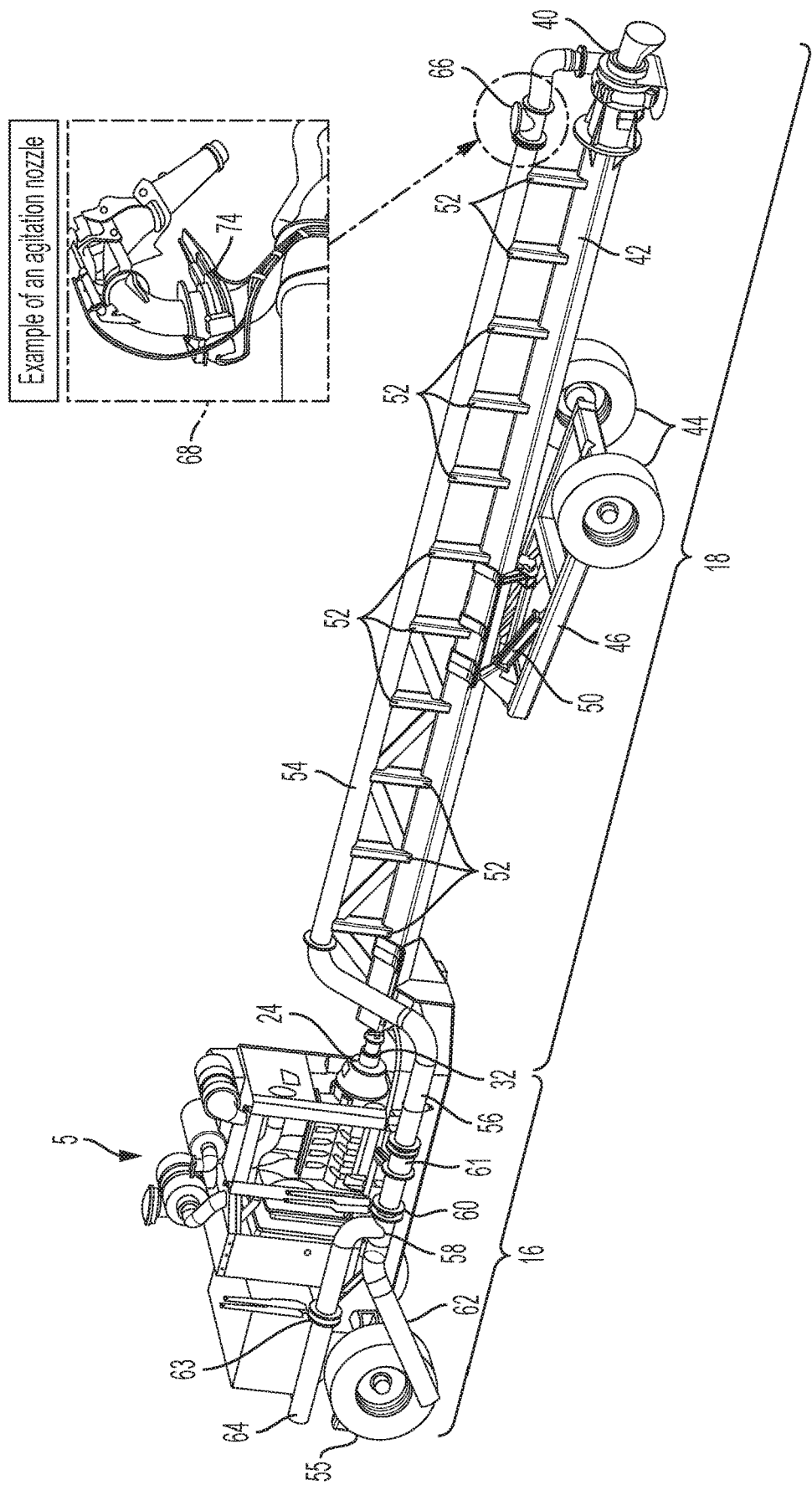
FIG. 5 is a side elevational view of the trailered engine driven lagoon pump of FIGS. 1-3.

Referring to FIG. 5, a plurality of stanchion supports 52 extend upwards from the boxed frame 42 and each supports a section of pipe 54. As depicted, pipe 54 spans a majority of the length of the second wheeled section 18, parallel to and centered over the boxed frame 42. The stanchion supports 52 may separate the box frame 42 and pipe 54 a distance that ranges from 1 inch to 3 feet.

Figure 11:
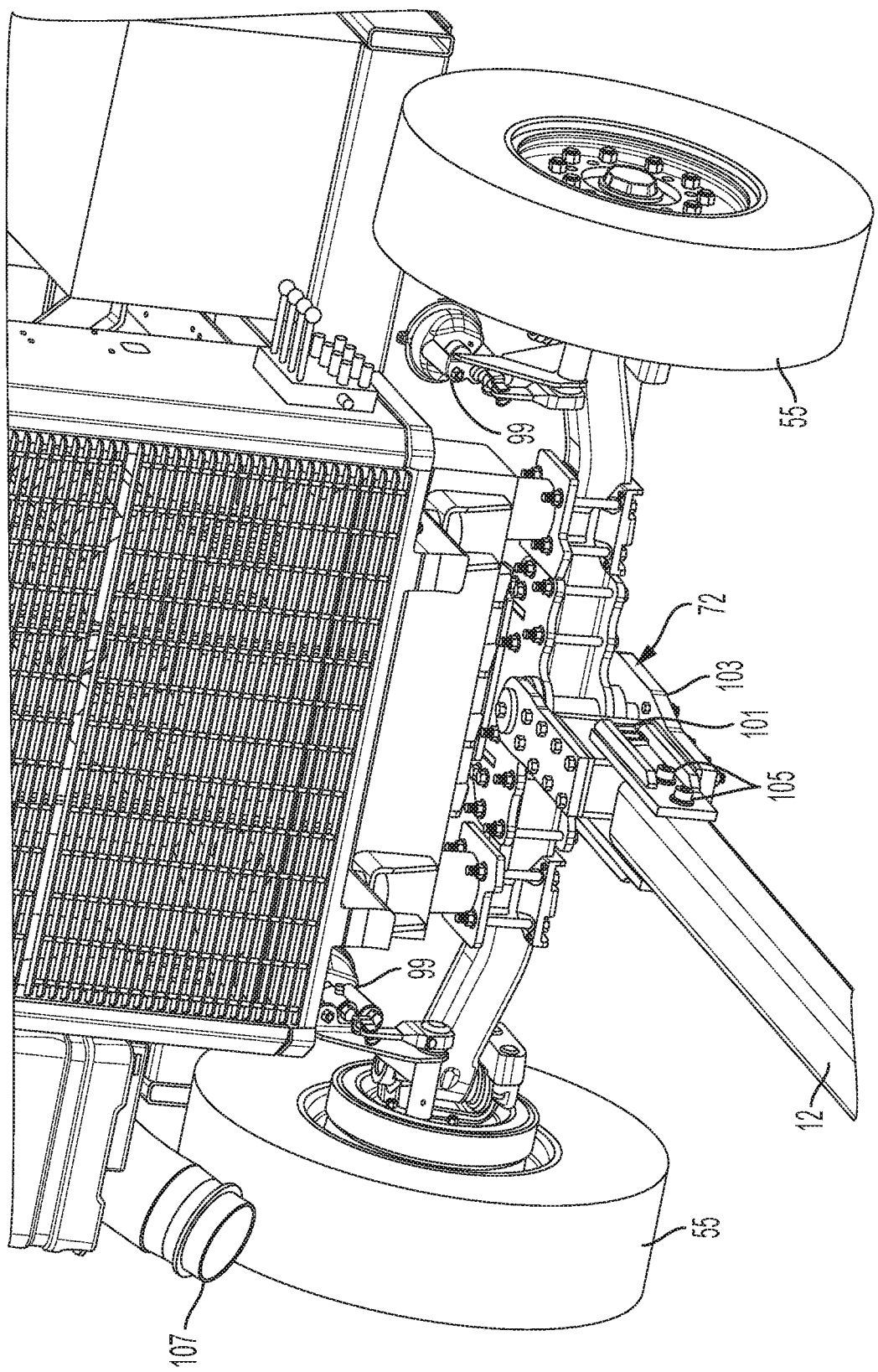

Pipe 54 is fluidically and rigidly connected to the outlet side of pump unit 40. Adjacent the coupling end of the driveline 32 to the clutch 24, additional piping 56 is provided along with a T-connection pipe 58, a supply valve 60, a flow meter 61, and a purge valve 63 that is connected to the top-portion/middle of T-connection pipe 58. It is to be appreciated that although in the depicted embodiment, these piping components 56, 58, 60, 61, and 63 are shown arranged on one lateral side of the lagoon pump 5, such components may conveniently arranged on the other lateral side of the lagoon pump 5, such as depicted by FIG. 11. In the embodiment of FIG. 11, outlet side 107 of the bottom portion of the T-connection pipe 58 to which a hose(s) 62 (FIG. 5) connects is shown on the lateral side opposite to the lateral side shown in FIG. 5. These piping components 56, 58, 60, 61, and 63 are all provided in the first wheel support section 16 and fluidically connect the pipe 54 to either a length of hoses 62 or to an entry point connector 64, e.g. for a pig or purge ball to clean out the hoses 62 when finished. During this clean out process, purge valve 63 is open and supply valve 60 is closed. An air compressor is used to push the purge ball through the hoses 62. Adjacent the pump unit 40, approximately above the connection point of the pump unit 40 to the boxed frame 42, a 'tee' connection 66 is providing for removably connecting and positioning an agitation nozzle 68.

When in an open position, the manure slurry drawn up by the pump unit 40 will exit from the agitation nozzle 68 to facilitate agitation/mixing of the liquid slurry and solid manure in the lagoon P. Closing the supply valve 60 will also ensure 100% of the manure slurry drawn up by the pump unit 40 is return to the lagoon by the agitation nozzle 68. It is to be appreciated that a lagoon return percentage/recirculation ratio of the manure slurry drawn up by the pump unit 40 may be adjusted by operation of the supply valve 60 and/or openness of a gate valve 74 of the agitation nozzle 68. In other words, supply valve 60 and agitation gate valve 74 can both operate at fully open, fully close or partially open/close to achieve desired system performance.

Figure 6:
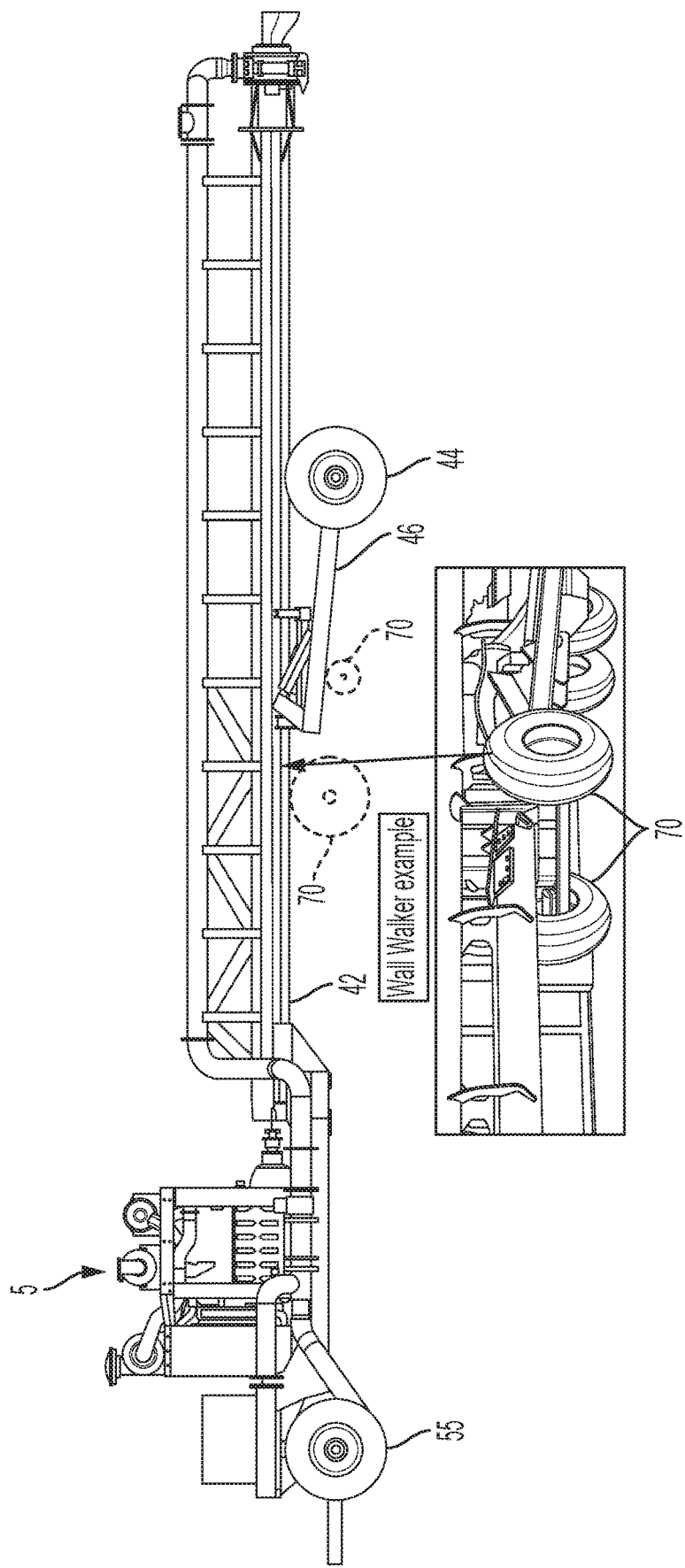
FIG. 6 is a side plan view of a trailered engine driven lagoon pump according to another embodiment.

Referring to FIG. 6, in a further embodiment, "Wall walker" wheels 70 may also be provided to allow the lagoon pump 5 to be backed into a storage pit with a (deep) straight wall. As depicted, such wheels 70 may be provide forward of the sub-frame 46 and mounted to the boxed frame 42. In other embodiments, these wheels 70 may be mounted to the sub-frame 46.

Figure 7:
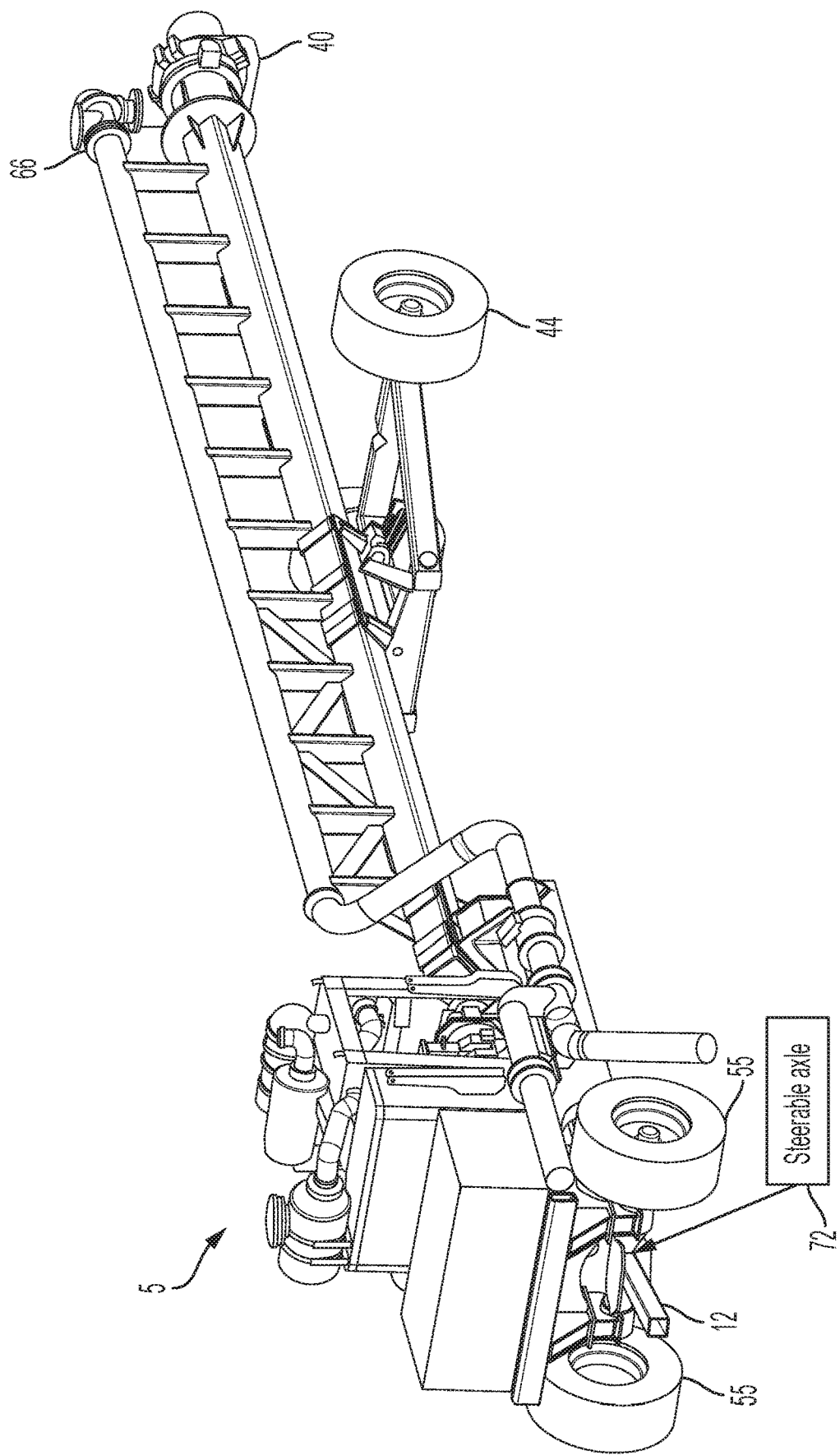
FIG. 7 is a front and side elevational view of a trailered engine driven lagoon pump according to another embodiment.
Figure 8A:
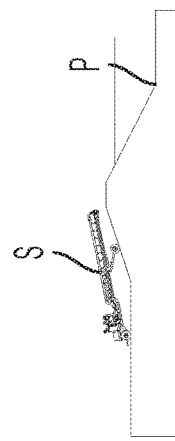
FIGS. 8A-8K are depictions of transporting and positioning a trailered engine driven lagoon pump according to any one of the embodiments described herein in a lagoon to mix and pump a slurry material, like liquid manure.
Figure 8E:
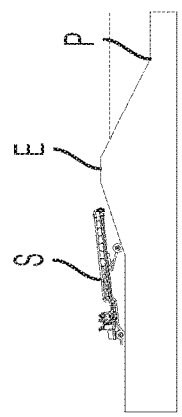
Figure 8I:
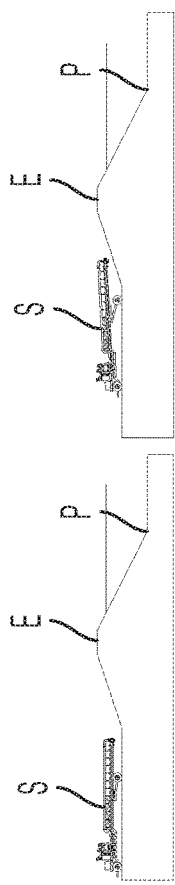
Figure 8B:
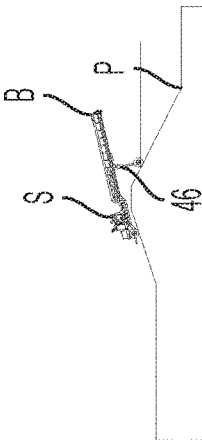
Figure 8F:
Figure 8J:
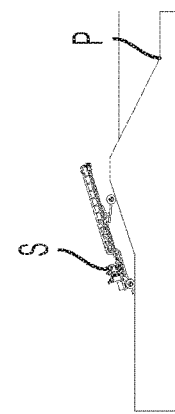
Figure 8C:
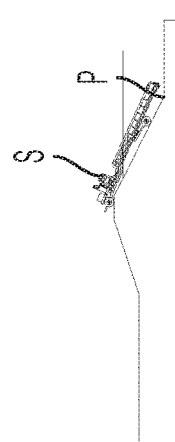
Figure 8G:
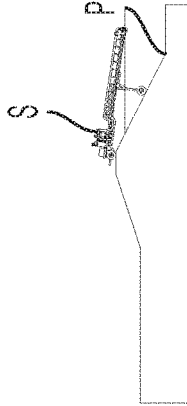
Figure 8K:
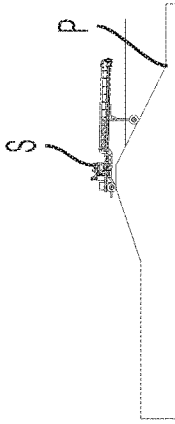
Figure 8D:
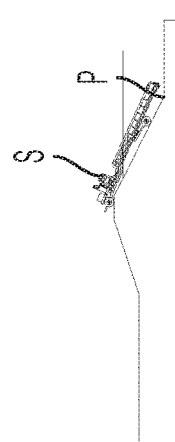
Figure 8H:
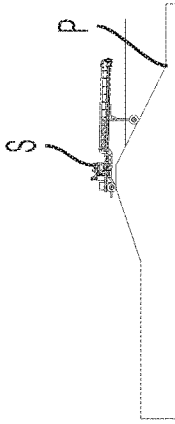

As depicted in FIG. 7, right and left hand wheels 55 may be mounted to ends of a steerable axle 72. The hitch plate or tow bar 12 likewise may be connected to the steerable axle 72. Such an arrangement increases the maneuverability of the lagoon pump 5 especially when being backed, such when being positioned into the lagoon P.

Figure 9:
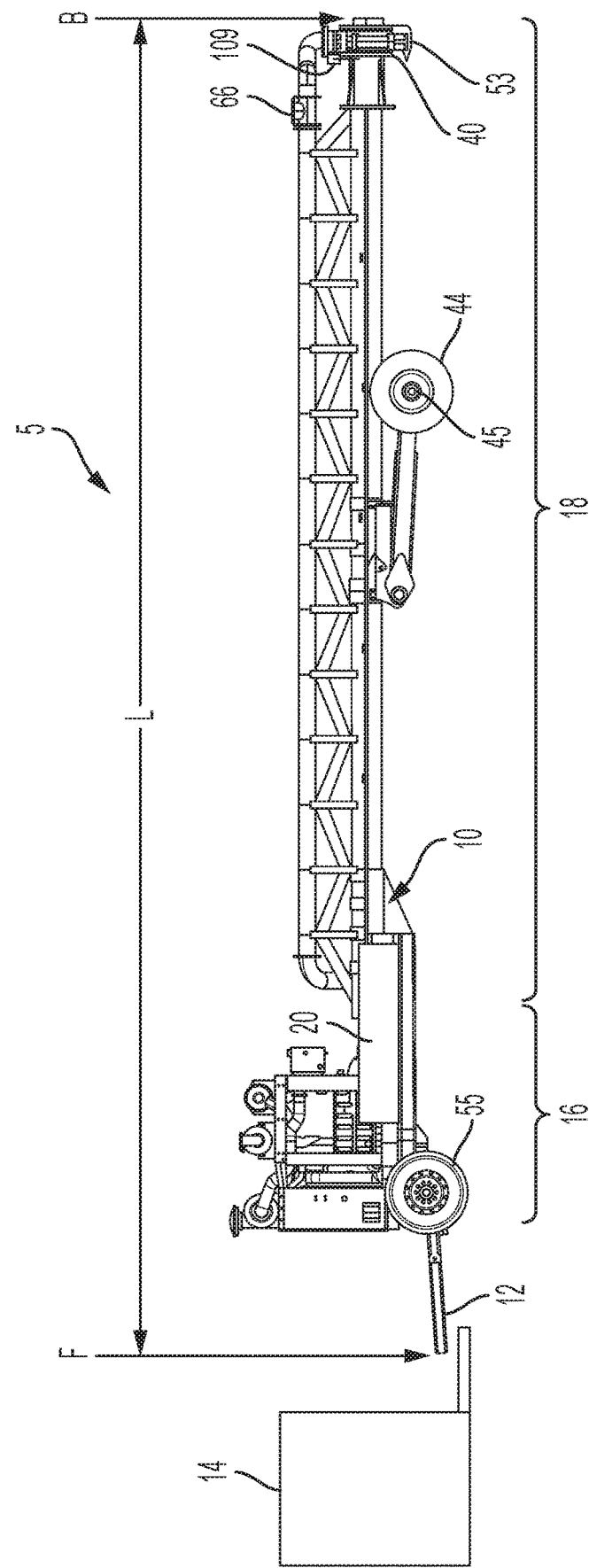
Figure 10:
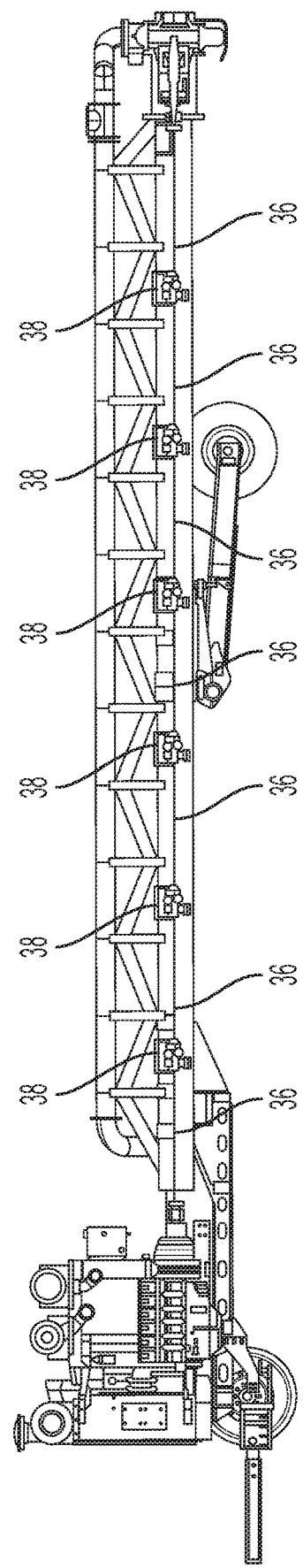

Referring now specifically to FIGS. 9-14, a trailered engine driven lagoon pump 5 according to a second embodiment is depicted. As the lagoon pump 5 is basically identical to the first embodiment depicted by FIGS. 1-7, only the differences there between are discussed hereinafter. In the second embodiment, the fuel tank 20 is provide adjacent the engine 22 rearward of the front wheels 55 but in the first wheeled support section 16 of the chassis structure 10. It is to be appreciated that due to the relocating of the fuel tank 20, the engine 22 likewise has been relocated forward, closer to the axel of the front wheels 55 than in the first embodiment (i.e., as compared to the location depicted by FIG. 1). Also in the second embodiment, as best depicted by FIG. 10 (with the fuel tank 20 removed for convenience of illustration), the driveline 32 is made of seven (7) driveline shafts 36 that are connected in series, via associated universal joints 38, for a total length of ranging from about 30 to about 50 feet. Also as depicted by FIG. 9, at the end of the lagoon pump 5, a skid plate 53 may be provided to protect the pump 40 from impact when being backed and/or lowered as well as a pair of magnetically mounted, wireless taillights 109.

As depicted by FIGS. 11-14, in the second embodiment the steerable axle 72 of the front wheels 55 enables up to 70° degrees of steering (steered via tow bar 12). A pivotable tongue 101 is provided to permit the tow bar 12 to pivot up and down relative to a pitman arm 103 of the steerable axle 72 as well as to provide removable attachment points 105, e.g., coupled via nuts and bolts, thereto (FIG. 11) for the tow bar 12. It is to be appreciated that up until the present invention it is believed that commercially available steering axles can only achieve steering angles up to 45° to 55° due to interferences which does not permit parallel steering to be maintained at higher steering angles. However, as shown by the bottom view illustrated by FIG. 12, the steerable axle 72 has an offset steering geometry which maintains parallel steering for a maximum steer angle of 70°. By "parallel steering" it is meant that both wheels 55 steer equally and the total steer angle is not limited by links going solid (i.e., links become in line with each other) until a theoretical 90° steering angle. In the illustrated embodiment, the steerable axle 72 has a pair of inner tie rods 76a, 76b of equal lengths mounted offset from each other at their respective rod ends 78a, 78b along the centerline CL of the steerable axle 72 directly to the pitman arm 103. At the opposite ends thereof, the inner tie rods 76a, 76b are connected each to a respective one of a pair of outer tie rods 80a, 80b. In this embodiment, the first outer tie rod 80a is shorter in overall length than the second outer tie rod 80b.

As depicted by FIGS. 13A and 13B, the inner tie rod ends 78a, 78b are curved such that they do not interfere with each other at large steering angles, i.e. at steering angles greater than 55° as well as when steering at full left lock (FIG. 13A) and full right lock (FIG. 13B), i.e., steering at 70° in both directions. Also, alternatively to the arrangement shown in FIG. 12, in the embodiment depicted by FIG. 13A, the attachment points 81a, 81b of each of the inner tie rods 76a, 76b to each respective one of the outer tie rods 80a, 80b may be at different locations on the outer tie rods from each other to likewise provide the lagoon pump 5 with a steering angle of ±70° from centerline CL (FIG. 12), and in which embodiment the inner tie rods 76a, 76b are equal in length $L_{itr}$ (FIG. 14) to each other and likewise the outer tie rod 80a, 80b are equal in length $L_{otr}$ (FIG. 13B) to each other. In still another embodiment, the attachment points 81a, 81b may be at the same location on the outer tie rods 80a, 80b, but the length $L_{itr}$ of each of the inner tie rods 76a, 76b are different from each other, and in which case the length $L_{otr}$ of the outer tie rods 80a, 80b are equal to each other in order to provide the lagoon pump 5 with the steering angle of ±70° from centerline CL (FIG. 12).

Figure 12:
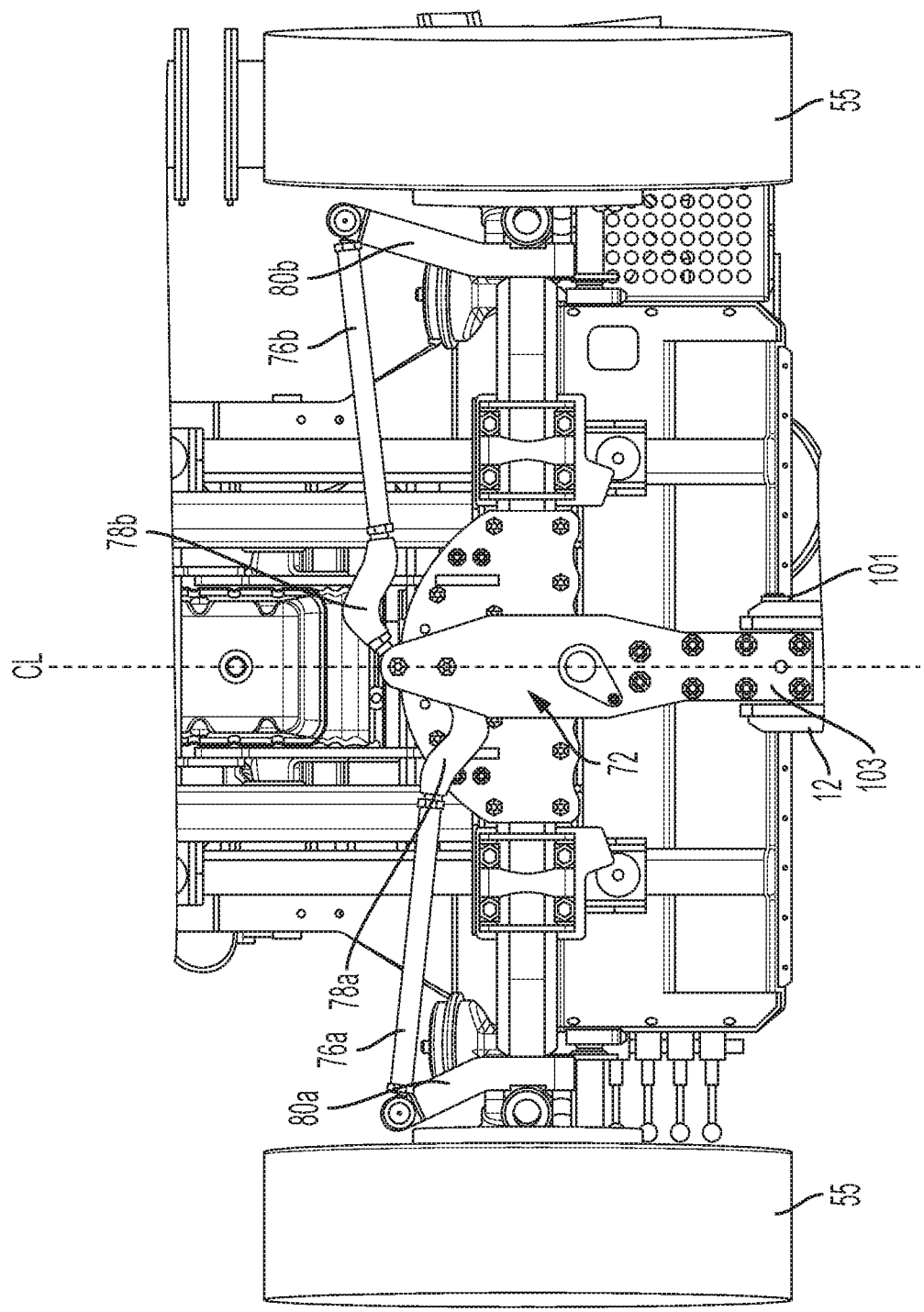
Figure 14:
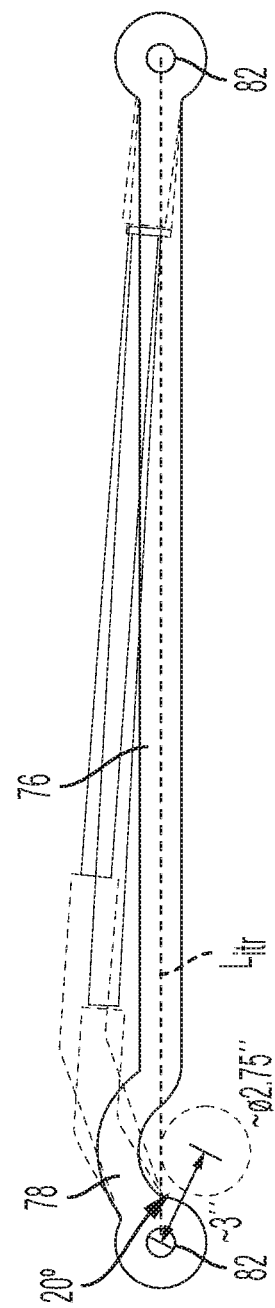

As depicted by FIG. 14, the shape of the curved end 78 of the inner tie rod 76 can vary so long as it clears another inner tie rod end of the same diameter spaced at about 3 inches from the first at an angle of 20° from the centerline CL (FIG. 12). It is also to be appreciated that the opposed mounting points (through bores) 82 adjacent the ends of the inner tie rode 76 are centrally aligned which each other along the longitudinal length of the rod. Increased steering provides for increased maneuverability which is especially helpful when positioning the pump 5 into a pit P, such as in the manner depicted by FIGS. 8A-8K.

While this invention has been described in connection with a single embodiment, it will be understood that these embodiments are capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

What is claimed is:

1. A trailered engine driven lagoon pump comprising:
   an elongated chassis structure having a front end and a rear end;
   a tow bar coupled releasably to the front end of the elongated chassis structure;
   a centrifugal pump coupled to the rear end of the elongated chassis structure;
   a diesel engine rated for 250 to 1000 horsepower fluidly connected to a fuel tank, wherein the diesel engine is mounted on the elongated chassis structure;
   an extended driveline rotationally connected to the diesel engine at one end and to the centrifugal pump at an opposed end to drive the centrifugal pump via rotational energy from the diesel engine, wherein the extended driveline has a total length ranging from 30 to 50 feet and is driven by the diesel engine to rotate at 1300 to 2300 RPM;
   a set of left and right hand ground engaging wheels are connected under the chassis structure between the front and rear ends, wherein the ground engaging wheels are extendable radially outwardly relative to the elongated chassis structure; and
   a pair of steerable wheels connected adjacent the front end of the elongated chassis structure.

2. The trailered engine driven lagoon pump of claim 1, further comprising a clutch positioned between the diesel engine and the extended driveline.

3. The trailered engine driven lagoon pump of claim 1, wherein the elongated chassis structure has a length ranging from 35 to 75 feet.

4. The trailered engine driven lagoon pump of claim 1, wherein the fuel tank has a fuel capacity ranging from 250 to 1000 gallons.

5. The trailered engine driven lagoon pump of claim 1, wherein the extended driveline is made of at least one (1) and up to ten (10) driveline shafts that are connected in series, via associated universal joints.

6. The trailered engine driven lagoon pump of claim 1, wherein the extended driveline rotates the centrifugal pump to provide a pumping capacity that ranges from 1000 to 10000 GPM.

7. The trailered engine driven lagoon pump of claim 1, wherein the ground engaging wheels are extendable radially outwardly by a pivot angle α that ranges from 0 to 90 degrees.

8. The trailered engine driven lagoon pump of claim 1, wherein the ground engaging wheels are further rotatable axially relative to the elongated chassis structure.

9. The trailered engine driven lagoon pump of claim 8, wherein the ground engaging wheels are rotatable axially by a side-to-side roll angle ω that ranges from 0 to 25 degrees on each side.

10. The trailered engine driven lagoon pump of claim 1, further comprising wall walker wheels.

11. The trailered engine driven lagoon pump of claim 1, wherein the steerable wheels provide parallel steering.

12. The trailered engine driven lagoon pump of claim 11, wherein the pair of steerable wheels are mounted to ends of a steerable axle configured to provide up to 70° degrees of side-to-side steering to the steerable wheels, the side-to-side steering measured as an angle between a centerline of the elongated chassis structure and the tow bar.

13. The trailered engine driven lagoon pump of claim 12, wherein the steerable axle has a pitman arm to which a pair of inner tie rods are directly mounted offset from each other at their respective rod ends along a centerline CL of the steerable axle, wherein at opposite ends thereof, the inner tie rods are connected each to a respective one of a pair of outer tie rods, and wherein the outer tie rods are also connected to the steerable wheels.

14. The trailered engine driven lagoon pump of claim 13, wherein the pair of inner tie rods are of equal lengths.

15. The trailered engine driven lagoon pump of claim 13, wherein the inner tie rod ends connected to the pitman arm are curved such that they do not interfere with each other at large steering angles greater than 55°.

16. The trailered engine driven lagoon pump of claim 13, wherein attachment points of each of the inner tie rods to each respective one of the outer tie rods is at different locations on the outer tie rods from each other and in which the inner tie rods are equal in length $L_{itr}$ to each other and the outer tie rod are equal in length $L_{otr}$ to each other.

17. The trailered engine driven lagoon pump of claim 13, wherein a length $L_{itr}$ of each of the inner tie rods are different from each other, and a length $L_{otr}$ of the outer tie rods are equal to each other.

18. The trailered engine driven lagoon pump of claim 13, wherein a length $L_{itr}$ of each of the inner tie rods are the same, and a length $L_{otr}$ of the outer tie rods are different from each other.

19. A method of mixing and pumping a slurry material, like liquid manure, from a lagoon or storage pit such as to spread at a field destination or into a suitable transport tank or spreading vehicle comprising utilizing a trailered engine driven lagoon pump of claim 1.

20. A steerable axle comprising a pitman arm to which a pair of inner tie rods are directly mounted offset from each other at their respective rod ends along a centerline CL of the steerable axle, wherein at opposite ends thereof, the inner tie rods are connected each to a respective one of a pair of outer tie rods, and wherein the outer tie rods are connected to steerable wheels, wherein the inner tie rod ends are curved such that they do not interfere with each other at large steering angles greater than 55°.

* * * * *